United States Patent [19]

Rice

[11] Patent Number: 5,600,940
[45] Date of Patent: Feb. 11, 1997

[54] APPARATUS FOR APPLYING LOTION TO A HOOF

[76] Inventor: Winston Rice, Box 40, Site 2, R.R. #8, Calgary, Alberta, Canada, T2J 2T9

[21] Appl. No.: 238,883

[22] Filed: May 6, 1994

[51] Int. Cl.⁶ .................................................. B68C 5/00
[52] U.S. Cl. ................................................. 54/82
[58] Field of Search ........................... 54/82; 168/2

[56] References Cited

U.S. PATENT DOCUMENTS

| | | | |
|---|---|---|---|
| 167,895 | 9/1885 | Hall | 168/2 |
| 235,447 | 12/1880 | Milliman | 54/82 |
| 715,059 | 12/1902 | Haglock | 54/82 |
| 719,687 | 2/1903 | Nickerson | 168/2 |
| 914,003 | 3/1909 | Woolverton . | |
| 2,163,361 | 6/1939 | Ford et al. | 168/2 |
| 3,800,504 | 4/1974 | Gregory | 54/82 |
| 4,548,026 | 10/1985 | Shidner | 54/82 |
| 4,911,150 | 3/1990 | Farley | 54/82 X |
| 5,209,048 | 5/1993 | Hanson | 54/82 |
| 5,224,549 | 7/1993 | Lightner | 168/18 |

*Primary Examiner*—Robert P. Swiatek
*Attorney, Agent, or Firm*—G. F. Gallinger; Anthony R. Lambert

[57] ABSTRACT

An apparatus for applying lotion to a hoof which includes a cuff-like conical body having a first edge and a second edge. The conical body extends outwardly from the first edge to the second edge. The conical body is split along opposed split edges which extend between the first edge and the second edge. The conical body has an exterior surface and an interior surface. An absorbent lining is positioned on the interior surface of the conical body, whereby lotion is maintained in contact with a hoof. One of the opposed split edges is secured to the conical body whereby the conical body is maintained in a position overlying the hoof.

4 Claims, 2 Drawing Sheets

APPARATUS FOR APPLYING LOTION TO A HOOF

The present invention relates to an apparatus for applying lotion to a hoof.

BACKGROUND OF THE INVENTION

A variety of lotions has been developed for the proper care of the hooves of domestic animals. U.S. Pat. No. 4,996,043 discloses such a lotion and teaches application with a paint brush, hand or cloth. U.S. Pat. No. 5,147,651 teaches application through the use of impregnated cloth pads. U.S. Pat. No. 4,447,418 and U.S. Pat. No. 4,822,595 teach application through spraying. In each case the manner of application provide only short term relief for the animal. The lotion is quickly rubbed off and its beneficial effects lost when the animal is released to pasture.

SUMMARY OF THE INVENTION

What is required is an apparatus for applying lotion to a hoof which will enable the lotion to work over a longer period.

According to the present invention there is provided an apparatus for applying lotion to a hoof which includes a cuff-like conical body having a first edge and a second edge. The conical body extends outwardly from the first edge to the second edge. The conical body is split along opposed split edges which extend between the first edge and the second edge. The conical body has an exterior surface and an interior surface. An absorbent lining is positioned on the interior surface of the conical body, whereby lotion is maintained in contact with a hoof. Means is provided for securing one of the opposed split edges to the conical body whereby the conical body is maintained in a position overlying the hoof.

The apparatus, as described above, holds the lotion in contact with the hoof. The animal can be released to pasture confident that the animal will continue to received the beneficial effects of the lotion. The hoof is checked periodically and the lotion in the absorbent lining is replenished.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
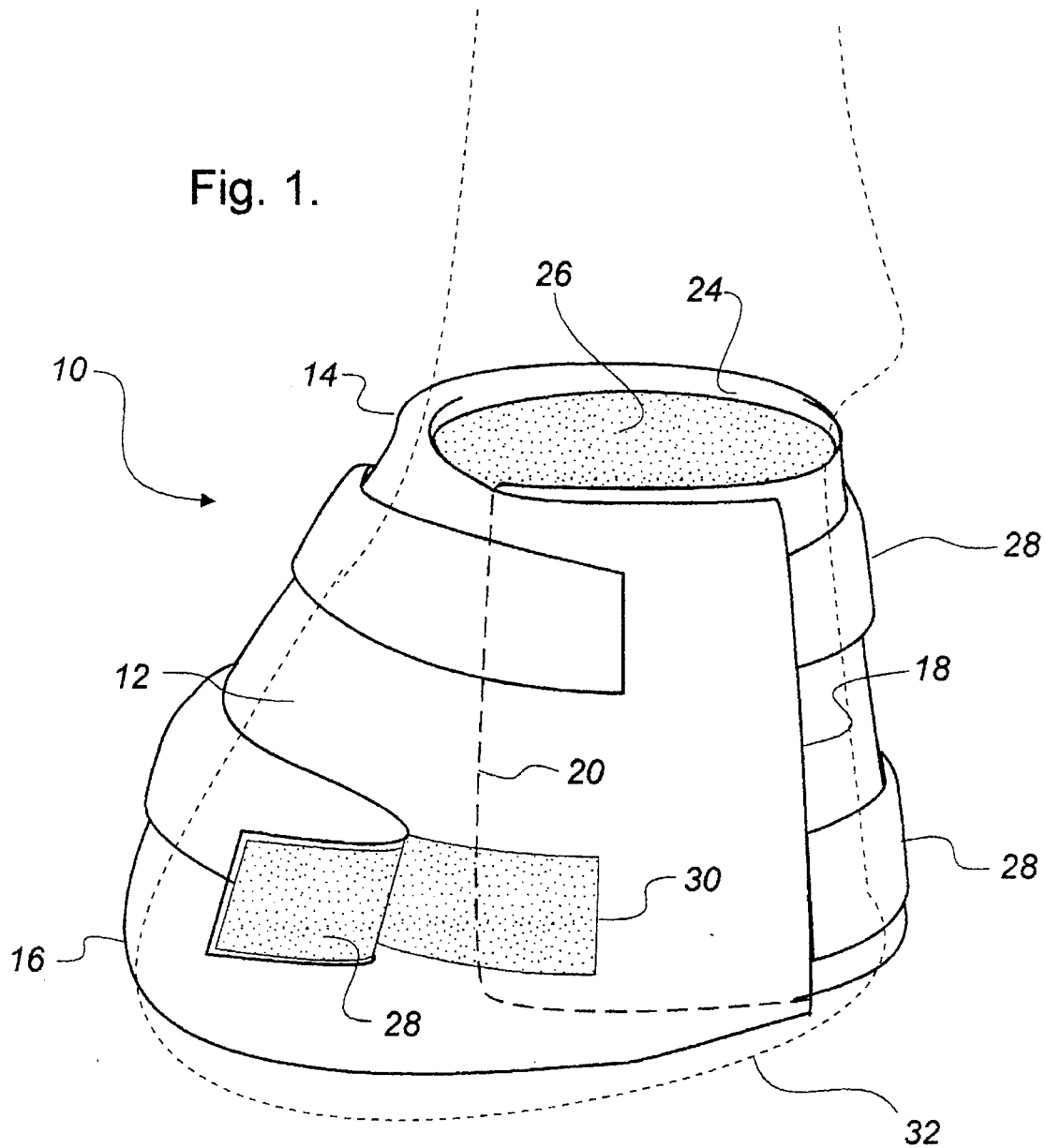
FIG. 1 is a perspective view of an apparatus for applying lotion to a hoof constructed in accordance with the teachings of the present invention.

The preferred embodiment, an apparatus for applying lotion to a hoof generally identified by reference numeral 10, will now be described with reference to FIGS. 1 and 2.

Figure 2:
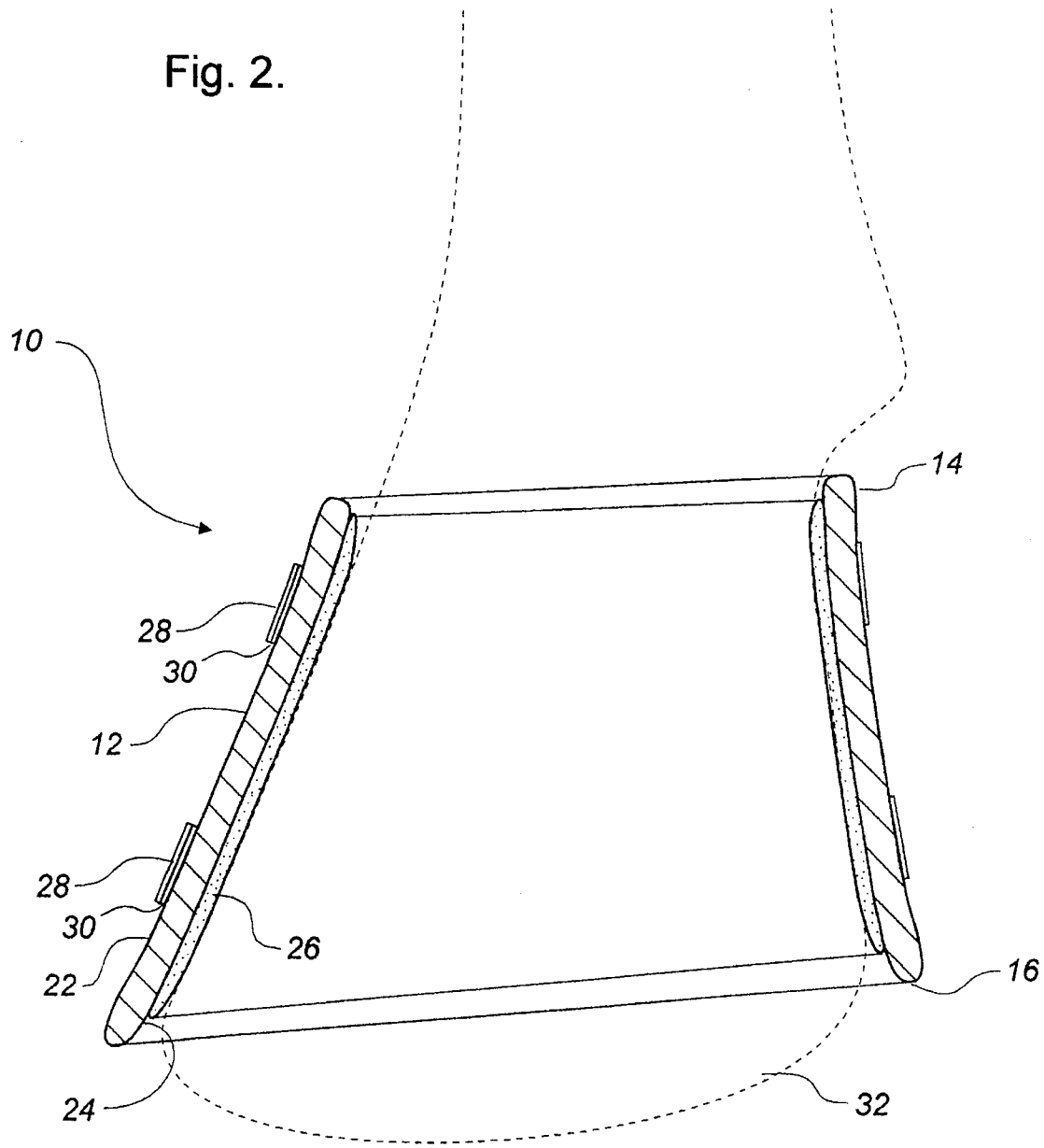
FIG. 2 is a side elevation view in longitudinal section of the apparatus illustrated in FIG. 1.

Referring to FIG. 1, apparatus 10 includes a cuff-like conical body 12 having a first or top edge 14 and a second or bottom edge 16. Conical body 12 extends outwardly from first edge 14 to second edge 16. Conical body 12 is split along opposed split edges 18 and 20 which extend between first edge 14 and second edge 16. Conical body 12 has an exterior surface 22, as illustrated in FIG. 1, and an interior surface 24, as illustrated in FIG. 2. Referring to FIG. 2, an absorbent lining 26 is positioned on interior surface 24 of conical body 12. Referring to FIG. 1, split edge 18 is secured to exterior surface 22 of conical body 12 by means of mating fasteners 28 and 30.

The use of apparatus 10 will now be described with reference to FIGS. 1 and 2. Referring to FIG. 2, absorbent lining 26 is impregnated with lotion and then conical body 12 is positioned on a hoof 32. Split edge 18 is then secured to exterior surface 22 of conical body 12 by mating fasteners 28 and 30. In the preferred embodiment fasteners 28, 30 are hook and fabric tape type strips such as sold under the trademark VELCRO. Fastener 28 has one end portion attached to edge 18. Fastener 30 is a mating strip having one side attached to exterior surface 22. This maintains conical body 12 in a position overlying hoof 32. When conical body 12 is in the position described, absorbent lining 26 and, consequently, the lotion with which absorbent lining 26 is impregnated, are maintained in contact with hoof 32.

It will be apparent to one skilled in the art that modifications may be made to the illustrated embodiment without departing from the spirit and scope of the invention as hereinafter defined in the Claims. In particular, it will be apparent that there are a variety of different types of mating fasteners 28 and 30 which can be used, such as a belt and buckle configuration, snap fasteners, or various configurations of tape fasteners sold under the trade mark VELCRO.

The embodiments of the invention in which an exclusive property or privilege is claimed are defined as follows:

1. An apparatus for applying lotion to a hoof, comprising:
   a. a cuff-like conical body having a first edge and a second edge, the conical body extending outwardly from the first edge to the second edge, the conical body being split along opposed split edges which extend between the first edge and the second edge, the conical body having an exterior surface and an interior surface;
   b. an absorbent lining on the interior surface of the conical body, whereby lotion is maintained in contact with a hoof; and
   c. means for securing one of the opposed split edges to the conical body adjacent both the first edge and the second edge whereby the conical body is maintained in a position over lying the hoof.

2. An apparatus as in claim 1 wherein the means for securing one of the opposite split edges to the body comprises two pairs of mating fasteners.

3. An apparatus as in claim 2 wherein the fasteners are of the hook and fabric tape type such as sold under the trademark VELCRO.

4. A method of applying lotion to a hoof comprising the following steps:
   a) applying the lotion to an absorbent lining on an interior surface of a cuff-like conical body having a first edge and a second edge, the conical body extending outwardly from the first edge to the second edge, and the conical body being split along opposed split edges which extend between the first edge and the second edge; and then,
   b) securing one of the opposed split edges to the conical body adjacent both the first edge and the second edge so that the conical body is maintained in a position overlying the hoof and the lotion on the interior surface thereof is maintained in contact with the hoof.

* * * * *